United States Patent [19]
Crane et al.

[11] Patent Number: 5,869,727
[45] Date of Patent: Feb. 9, 1999

[54] VACUUM PROCESS FOR THE MANUFACTURE OF SILOXANE-OXYALKYLENE COPOLYMERS

[75] Inventors: William E. Crane, Sistersville; Paul E. Austin, Williamstown, both of W. Va.

[73] Assignee: OSi Specialties, Inc., Greenwich, Conn.

[21] Appl. No.: 908,605

[22] Filed: Aug. 8, 1997

[51] Int. Cl.$^6$ ....................................................... C09F 7/08
[52] U.S. Cl. ............................................. 556/445; 556/444
[58] Field of Search ..................................... 556/445, 444

[56] References Cited

U.S. PATENT DOCUMENTS

| | | |
|---|---|---|
| 2,886,600 | 5/1959 | Horsley et al. . |
| 3,280,160 | 10/1966 | Bailey . |
| 3,507,815 | 4/1970 | Bailey et al. . |
| 3,507,923 | 4/1970 | Gessner et al. . |
| 3,716,517 | 2/1973 | Pittman et al. . |
| 3,716,518 | 2/1973 | Pittmann et al. . |
| 3,739,237 | 6/1973 | Watkinson . |
| 3,792,073 | 2/1974 | Prokai et al. . |
| 3,836,560 | 9/1974 | Prokai et al. . |
| 4,122,029 | 10/1978 | Gee et al. . |
| 4,150,045 | 4/1979 | Sinha . |
| 4,150,048 | 4/1979 | Schilling, Jr. et al. . |
| 5,767,219 | 6/1998 | Takarada .............................. 556/445 X |

OTHER PUBLICATIONS de Marginan, et al. "Liquid Crystalline Side–Chain Polymers" *Butterworth & Co. Ltd.* Polymer, 1988, vol. 29, Jul. pp. 1318–1322.

Dvornic et al. "Polymerization By Hyrosilation. 1. Preparation of Poly [1,1,3,3–tetramethyldisiloxanyl)ethylene]". Macromolecules 1994, 27, 1068–1070.

Chemical Abstracts vol. 74, 1971; vol. 82, 1975, p. 36.

*Primary Examiner*—Paul F. Shaver
*Attorney, Agent, or Firm*—Edward K. Welch, II; Andrew S. Reiskind; Timothy X. Witkowski

[57] ABSTRACT

Disclosed is an improved process for the manufacture of silicone containing copolymers via a hydrosilation reaction, in which the catalyzed reaction of organohydrosiloxane and olefinic polyether is carried out at between 20°–120° C., preferably 70°–120° C., under a vacuum between 750–1 mmHg. The reaction under these conditions results in a copolymer of a higher quality as compared to copolymers made by the traditional method without the benefit of a vacuum. If desired, the reaction can be taken to its clear point in a volatile compatibilizing solvent (for example toluene, xylene, or isopropyl alcohol), this solvent can then be removed from the reaction system, and another less volatile solvent, such as dipropylene glycol or polypropylene glycol, may then be added.

29 Claims, No Drawings

VACUUM PROCESS FOR THE MANUFACTURE OF SILOXANE-OXYALKYLENE COPOLYMERS

FIELD OF THE INVENTION

This invention relates in general to an improved process for the manufacture of siloxane-oxyalkylene copolymers. In one aspect, this invention is directed to a process for the manufacture of improved siloxane-oxyalkylene copolymer compositions. In another aspect, this invention relates to an improved process for the removal of the volatile solvent when such a solvent is detrimental to the product. In a further aspect, the present invention relates to siloxane-oxyalkylene copolymers that show improved performance for use as surfactants in manufacturing polyurethane foam, coatings applications, and especially in personal care applications.

BACKGROUND OF THE INVENTION

Certain types of nonhydrolyzable siloxane-polyether copolymers are well known in the art and are readily available through many suppliers. These copolymers are manufactured by the coreaction of poly(dimethyl-siloxanes) containing SiH groups (hydrosiloxanes) with olefinic polyethers wherein the olefinic sites are allyl groups. The general reaction whereby these nonhydrolyzable linkages are created between silicone and polyether groups is:

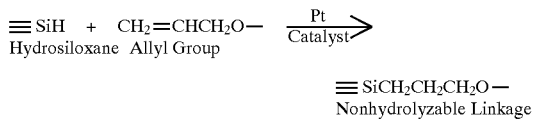

However, the above reaction is not the sole reaction that is taking place during the preparation of the copolymer. It has been established that a significant percentage of the allyl groups are isomerized under the addition reaction conditions to give propenyl polyethers which do not participate in the hydrosilation reaction:

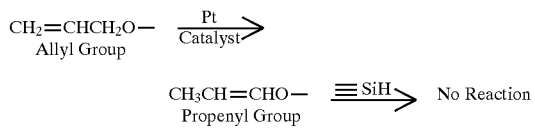

See, for example, U.S. Pat. Nos. 3,507,923 and 3,836,560.

It has become common practice in the industry to use stoichiometric excesses (20 mole % or more) of the allyl polyethers to insure reaction of all the SiH groups. The excess unreacted allyl polyether or isomerized propenyl polyether are thus present as inert diluent, thereby reducing the potency or active concentration of the final copolymer.

Another competing undesirable reaction is that some of the SiH groups react with sources of hydroxy containing contaminants, or solvents containing hydroxy functionality such as water, methanol or ethanol. These act as SiH group scavengers and react in the following manner:

This conversion of the SiH sites to SiOR sites acts to reduce the number of incorporated polyether moieties and it is known that the hydrogen gas released from this undesirable side reaction can be catalytically added across the double bond of the polyether. This reduces the effective concentration of olefinic polyether available for reaction. The overall effect is to reduce the molecular weight of the final copolymer. The reaction would look as follows:

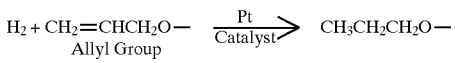

Another source of concern is the HCl that is liberated when using hexachloroplatinic acid. It was clearly demonstrated by a group of French investigators that the hexachloroplatinic acid will liberate HCl as a by-product in the reaction system. This by-product is suspected to have a deleterious effect on the reaction system (for example, by inducing parallel protodesilylation reaction at the —C—Si— main chain bonds). This is shown by G. deMarignan, D. Teysse, S. Boileau, J. Malthete and C. Noel, *Polymer*, 29, 1318 (1988).

It is shown by P. R. Dvornic and V. V. Gerov in *Macromolecules*, 27, 1068 (1994) that the use of neutral platinum-divinyldisiloxane complex [Pt-DVDS], also known as Karstedt catalyst, will give [AB]n type molecules of increased molecular weight when compared to the use of hexachloroplatinic acid as catalyst. The use of Pt-DVDS enabled the synthesis of copolymers with a molecular weight of typically 30,000 daltons but in optimized conditions, 75,000 daltons. These compare to copolymers of molecular weight of the order of 1000–2000 daltons when using hexachloroplatinic acid. Although this is one method for obtaining increased molecular weight copolymers, the use of Pt-DVDS can result in the undesirable reaction of the DVDS into the backbone of the copolymer. This does not have an impact on the molecular weight obtained, but it could have a deleterious effect on how the copolymer performs in a particular application. For example, if this product was used in the manufacture of a polyurethane foam it would result in foam of inferior quality or, even worse, collapse the foam. The use of Pt-DVDS is also economically disadvantageous when compared to other hydrosilation catalysts.

U.S. Pat. No. 4,122,029 teaches the use of copolymers in the manufacture of emulsions for use in cosmetic applications. It is also stated, in U.S. Pat. No. 4,150,048 that high molecular weight non-hydrolyzable block copolymers may be useful in cosmetic applications. It is well known that products for use in cosmetic applications need to be of low odor, low color, free of toxic solvents, and of high molecular weight.

It is stated in U.S. Pat. No. 3,792,073 that linear siloxane-polyether copolymers of high molecular weight have very useful properties as surfactants for the preparation of mechanically frothed urethane foam and U.S. Pat. No. 3,793,237 shows their utility when used in open-celled rigid urethane foam. U.S. Pat. No. 4,150,048 states in column 3 that these desirable foam properties are derived from their high molecular weight. It also states that the desired degrees of polymerization (herein signified as $(DP)_n$) are 18 or higher. In that patent, the desired degrees of polymerization could only be obtained by using a heterogeneous platinum on carbon catalyst. If a homogeneous solution of hexachloroplatinic acid catalyst was used, the maximum degree of polymerization obtainable was 14.12. This corresponds to a maximum GPC average molecular weight $(M_w)$ of 56,000. These lower $DP_n$ and $M_w$ values are suggested to be caused by silicon-bonded hydrogen atoms being consumed in side reactions, such as with water inadvertently present in the system, or in the chloroplatinic acid in the hexahydrated form, or in other side reactions with protonic solvents such as methanol, ethanol, isopropanol or n-propanol. These low $DP_n$ and $M_w$ copolymers are not as active, and when the platinum on carbon catalyst is employed to obtain the higher molecular weight copolymers the resulting product suffers from the fact that the catalyst must be filtered to remove it from the product. The filtration process is a slow and expensive step due to the high viscosity of the final product and its propensity to foam during the filtration process. Even after filtration the product is reported to still possess a high color from residual unfilterable catalyst on carbon.

The current invention results in copolymers with a higher $DP_n$ and a high molecular weight. It will be shown herein that use of the described process results in copolymers with higher degrees of polymerization than were obtainable in U.S. Pat. No. 4,150,048 using the same ratio of reactants. It will further be shown that the resulting copolymer no longer requires the final filtration step and yields an improved color and low odor product. It will also be shown that this improved process can use the economically more advantageous hexachloroplatinic acid catalyst to give these results.

SUMMARY OF THE INVENTION

One aspect of the present invention is a process of producing siloxane-polyoxyalkylene copolymers, especially of the $[AB]_n$ type, by reacting hydrosiloxane and allyl-terminated pol(oxyalkylene) under a vacuum of 1–750 mmHg.

This invention is based in part on the novel and unexpected discovery that when a hydrosilation reaction is conducted utilizing soluble hexachloroplatinic acid catalyst under vacuum, the resulting [AB]n copolymer possesses a higher degree of polymerization. It is further based on the catalyzation of the reaction at or near room temperature to help reduce the amount of SiH functionality consumed during the vacuum stripping. Finally it is based on a unique method for the removal of a volatile solvent during the hydrosilation reaction which avoids excessive foaming of the high molecular weight copolymer during devolatilzation. Since soluble hexachloroplatinic acid catalyst is used in the manufacture of these copolymers, the final product does not require filtration at the end of the process. The final products are stripped of any toxic, volatile solvents during the reaction step instead of a post reaction strip, thus eliminating an additional processing step and foaming problems associated with a post reaction vacuum strip. These materials, if run in a high molecular weight cosmetic grade solvent, will not require any additional processing upon completion of the hydrosilation reaction and will yield a high $DP_n$, low color and low odor copolymer. The nonhydrolyzable siloxane-organic ether copolymers of this invention have degrees of polymerization of greater than 17. (The term "degree of polymerization" pertains to the average sum of the numbers of siloxane blocks and organic ether blocks per molecule of said copolymers.) These copolymers are accordingly higher in active concentration and more potent, for example, in foam use applications in the case of the linear siloxane-polyether block copolymers as compared to siloxane-polyether block copolymers made in the traditional manner. Yields of higher quality active copolymers in batch commercial processes are obtained with shorter batch cycle times due to the combination or removal of processing steps. For example, the final product filtration is no longer necessary. This greatly reduces the batch cycle time, since in most cases these materials are of higher viscosity and therefore more difficult, or in some cases impossible, to filter. As another example, the need for a very difficult final product strip to remove any volatiles at the end of the hydrosilation reaction is no longer necessary. Once again, this greatly reduces the batch cycle time because the material is very good at stabilizing gases trapped in the liquid phase. If vacuum is pulled on the system without care, the material will froth and fill the reactor with stable foam. Therefore, the stripping of the high molecular weight, high viscosity final product is very difficult and time consuming. The use of chloroplatinic acid catalyst, the reduced batch cycle times, the higher $DP_n$, and the higher quality product make it easy for anyone skilled in the art to see the benefit of employing a partial pressure (vacuum) during the hydrosilation reaction.

This invention is also based in part on the use of the silicone-polyether copolymers herein described, either pendant or linear in structure, as surfactants or foam stabilizers in the preparation of various types of urethane foams, including flexible, rigid, high resiliency, polyester, semiflexible, mechanically frothed, or microcellular urethane foams.

The siloxane-polyether copolymers of the present invention can be used in water systems as wetting agents, thickeners, and emulsifiers. They are particularly suited for cosmetic applications due to the improved quality from the described process.

DETAILED DESCRIPTION OF THE INVENTION

The siloxane-ether copolymers of this invention are nonhydrolyzable copolymers of a polyorganohydrosiloxane and an organic ether (including polyethers). This invention describes a new process for the manufacture of improved nonhydrolyzable siloxane-ether copolymers. The ether is preferably composed of carbon, hydrogen and ether oxygen. Cross-linked copolymers of this invention may be obtained with an organohydrosiloxane reactant which has more than two silicon-bonded hydrogens per molecule. Linear or branched (pendant) block copolymers are obtained with a dihydropolyorganosiloxane reactant. A molar ratio of organohydrosiloxane to polyether reactant in the range of 0.85 to 1.3 is effective in producing high molecular weight copolymers. In the case of producing [AB]n type copolymers using dihydropolyorganosiloxanes, the preferred molar ratio of $CH_2=C(R)CH_2$— groups to silanic bonded H is about 1:1 because other ratios will limit the degree of polymerization and molecular weight. As the molar ratio is increased above or below 1:1, the degree of polymerization can be controlled to afford lower molecular weights as desired. However, lower molecular weight products have been shown to be not as effective in certain applications.

The organic ether reactants of the present invention contain $CH_2=C(R)CH_2$— end groups and include the monoethers and polyethers. They can be represented by the general formula, hereinafter referred to as formula I:

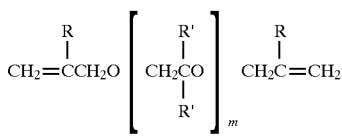

wherein R is hydrogen or a monovalent hydrocarbon group, R' is hydrogen or a monovalent hydrocarbon group and m is an integer of 0 to 100, preferably 1 to 100. Exemplary of the monovalent hydrocarbon groups that are represented by R and R' are the $C_1$–$C_{18}$ alkyl groups, for example, the methyl, ethyl, propyl, isopropyl, butyl, pentyl, hexyl, octyl, decyl, dodecyl, eicosyl and stearyl groups; the aryl groups, preferably containing 6 to 10 carbon atoms, for example, the phenyl and naphthyl groups; aralkyl groups, preferably the $C_6$–$C_{10}$-ar-$C_1$–$C_8$-alkyl groups, for example, the benzyl and phenylethyl groups; alkaryl groups, preferably the $C_1$–$C_8$-alk-$C_6$–$C_{10}$-aryl groups, for example, the tolyl, n-hexylphenyl groups; and cycloalkyl groups, preferably the $C_5$–$C_8$-cycloalkyl groups, for example cyclopentyl, cyclohexyl, cycloheptyl, and cyclooctyl groups. In the $[AB]_n$ copolymers, R is preferably an alkyl group. Methyl is the most preferred R group. R and R' individually can be the same or different throughout the ether or polyether molecule. When m is 0, the ether is a simple ether including di(alkallyl) ether, e.g., dimethallyl ether. When m is 1 or more, the ether represented by formula I is a polyether. Preferably, one R' is hydrogen and the other R' is methyl throughout some or all of —$CH_2C(R')_2O$— units in formula I. That is, such units can comprise oxypropylene units only or combined with other oxyalkylene units. Other preferred polyethers are those containing units in which both R' radicals are hydrogen (i.e. oxyethylene units) as well as units in which one R' is hydrogen and the other R' is methyl (i.e. oxypropylene units). When the polyether contains different —$CH_2C(R')_2O$— units, for example, oxyethylene units and oxypropylene units, such units may be randomly disposed throughout the polyether or can be disposed in one or more blocks of the same units in the polyether. For example, in the case of dimethallyl poly(oxyethyleneoxypropylene) ether, the oxyethylene units and oxypropylene units can be randomly distributed throughout the polyether molecule or they can be disposed in one or more blocks of oxyethylene units connected to one or more blocks of oxypropylene units. Thus, preferred $[CH_2C(R')_2O]m$ units in formula I can be represented by the formula:

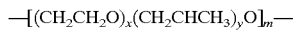

wherein x and y are each integers of 0 to 100 and x+y is an integer of 1 to 100. The copolymers of the present invention may contain, throughout the copolymer molecule, different ether or polyether moieties which are consistent with the above general formula.

Typical examples of polyethers which can be used in the processes of the present invention include dimethallyl ether and the following dimethallyl ethers of polyoxyalkylene glycols:

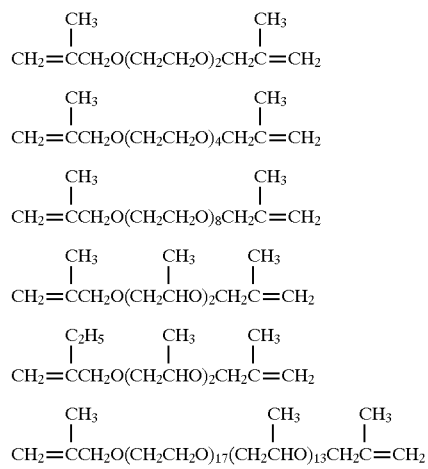

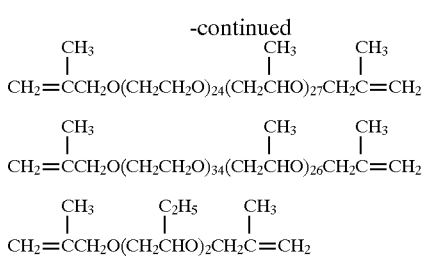

However, it is understood that the present invention is not limited to those polyethers listed but may include any polyether consistent with the general structure shown in formula I.

In addition, the present invention is not limited by the mode of preparation of the di(hydrocarballyl) ether or di(hydrocarballyl) polyether reactant. The di(hydrocarballyl) ethers, e.g. di(methallyl) ether, are readily prepared by known methods. The di(hydrocarballyl) diethers of polyoxylakylene glycols as depicted by formula I can be prepared by: (a) capping the corresponding hydrocarballyl alcohol ($CH_2$=$CRCH_2OH$)— started polyether, i.e., the hydrocarballyl monoether of the corresponding polyoxyalkylene glycol, with the desired hydrocarballyl chloride, $CH_2$=$CRCH_2Cl$, or (b) capping both ends of the corresponding polyoxyalkylene glycol with the desired hydrocarballyl chloride. For example, the most preferred polyether reactants, the di(methallyl) polyethers, can be prepared either by capping a methallyl alcohol-started polyether with methallyl chloride or by capping both ends of a polyoxyalkylene glycol with methallyl chloride. Typical procedures for capping are taught in DE3606173 and DE4138166. Other methallyl compounds may be used instead of methallyl chloride, including methallyl bromide, or iodide, or methallyl sulfonate esters.

Preparations of hydrocarballyl monoethers of polyoxyalkylene glycols by the addition polymerization of one or more alkylene oxides with a hydrocarballyl alcohol starter in the presence of a basic catalyst are well known. For example, there are two Japanese patents to Toray Industries, Inc., disclosing the base catalyzed preparations of methallyl monoethers of polyoxyalkylene glycols (see Jap. 70, 28,786, Chem. Absts., 74, 14138r (1971)), and, more specifically, methallyl monoethers of polyoxyethylene glycols (see Jap. 74, 15,480, Chem. Absts., 82, 17,595j (1975)). Capping procedures are taught in U.S. Pat. No. 3,507,815 which discloses the capping of butyl alcohol-started polyalkylene oxides with methallyl chloride and the resultant butyl methallyl diethers of polyoxyalkylene glycols. The preparation of methallyl alcohol-started, methyl-capped polyethers is taught in U.S. Pat. No. 3,507,923. In U.S. Pat. No. 2,886, 600, a methallyl polyether is prepared by reacting a polyether having a hydroxyl end group with isobutylene oxide and then dehydrating the reaction product. The procedures of these Japanese, German and United States patents can be employed in the present invention to produce the hydrocarballyl monoethers of polyoxyalkylene glycols having one hydroxyl end group and, of course, one hydrocarballyl end group. Thereafter, the hydroxyl end group is reacted, by methods known in the art, with a hydrocarballyl halide to provide the di(hydrocarballyl) diether of the polyoxyalkylene glycol.

Capping procedures wherein one or both hydroxyl end groups of a polyoxyalkylene glycol are reacted, or the hydroxyl end group of monoethers of said glycol, is reacted with an organic halide to provide the corresponding diether are known in the prior art. For example, U.S. Pat. Nos.

3,716,517 and 3,716,518 disclose the conversion of polyalkyleneoxy glycol monoethers into the corresponding monomethallyl ethers by reaction of said monoethers with methallyl bromide in the presence of a base to produce a monomethallyl polyether. While dimethallyl polyethers per se are not disclosed, they can be prepared by reacting methallyl bromide with a polyoxyalkylene glycol (which contains two terminal hydroxyls), or by reacting methallyl bromide with the methallyl monoether of the polyoxyalkylene glycol (which contains one terminal hydroxyl group), utilizing the procedures of these two patents. See, for example, col. 6, lines 19–26 of U.S. Pat. No. 3,716,517. Other di(hydrocarballyl) diethers of polyoxyalkylene glycols starting materials depicted by formula I are prepared by reacting the desired hydrocarballyl halide, $CH_2=CRCH_2X$ wherein R is as defined hereinabove and X the sulfonate anion or the halogen atom, such as chlorine, bromine, or iodine, with the desired polyoxyalkylene glycol (having two terminal hydroxyl groups), or with the desired hydrocarballyl monoether of the polyoxyalkylene glycol (having one terminal hydroxyl group), utilizing the procedures taught in U.S. Pat. Nos. 3,716,517 and 3,716,518.

The organohydrosiloxane reactant of the present invention is a dihydrosiloxane or a polyhydrosiloxane, i.e., those siloxanes containing two or more silicon-bonded hydrogen atoms, wherein any valences of silicon not bonded to hydrogen or to oxygen in a silicon to oxygen to silicon bond are bonded to a monovalent hydrocarbon group (such as those given above for R and R') or a monovalent halohydrocarbon group (such as chloromethyl, chlorophenyl, chlorobenzyl, etc.). The substituents on silicon should not interfere with the hydrosilation reaction. The preferred substituent on silicon is the methyl group which is designated herein as Me. Other groups such as chloropropyl, phenylethyl, or chloroisobutyl are illustrative of nonreactive functional groups which may be present as substituents on silicon to adjust the performance of the final product. Cyclic organohydrosiloxanes wherein hydrogen is attached to a silicon atom which either forms part of the ring or which does not form part of the ring can also be used as the organohydrosiloxane reactant in the present invention. Suitable organohydrosiloxane reactants include those having one or more units of the formula:

with or without one or more units of the formula:

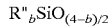

wherein R" is a monovalent hydrocarbon group or a halogen-substituted monovalent hydrocarbon group. Exemplary of the monovalent hydrocarbon groups that are represented by R" are the $C_1$–$C_{18}$ alkyl groups, for example, the methyl, ethyl, propyl, isopropyl, butyl, pentyl, hexyl, octyl, decyl, dodecyl, eicosyl and stearyl groups, the aryl groups, preferably containing 6 to 10 carbon atoms, for example, the phenyl and naphthyl groups; aralkyl groups, preferably the $C_6$–$C_{10}$-ar-$C_1$–$C_8$-alkyl groups, for example, the benzyl and phenylethyl groups; alkaryl groups, preferably the $C_1$–$C_8$-alk-$C_6$–$C_{10}$-aryl groups, for example, the tolyl, n-hexylphenyl groups, and cycloalkyl groups, preferably the $C_5$–$C_{10}$-cycloalkyl groups, for example cyclopentyl, cyclohexyl, cycloheptyl, and cyclooctyl groups. R" may be the same or different in the same unit or in the same molecule, a is an integer of 0 to 2, preferably 2, and b is an integer of 0 to 3, preferably 2.

The dihydrosiloxanes of the present invention may have structures wherein the two hydrogen atoms are attached to the same silicon atom or to different silicon atoms of the molecule. Also, the hydrogen atoms may be located either terminally or internally in each molecule. Typical examples of dihydrosiloxanes include the following, but are not limited thereto:

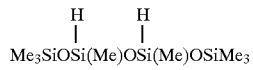

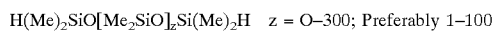

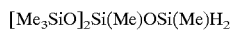

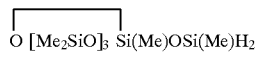

The dihydrosiloxanes most preferred for use in the present invention specifically include those structures so designed as to have two SiH groups in each molecule, i.e., the two silanic hydrogen atoms are attached to different silicon atoms of the dihydrosiloxane molecule. However, the molecules may vary widely in molecular weight and in structure from each other.

The polyhydrosiloxanes containing more than two silicon-bonded hydrogen atoms may also have any of several structures including blends thereof; such structural types as the following are included but are not inclusive of all the structures operative in the present invention.

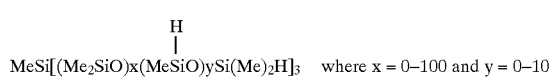

Particularly preferred organohydrosiloxanes are the linear siloxanes having a silicon-bonded hydrogen at each end as shown by the formula:

in which R" is an unsubstituted or halogen-substituted monovalent hydrocarbon group and z is an integer of 0 to 300, and preferably 1 to 100.

The organohydrosiloxane reactant, like the polyether reactant, may thus have a wide variety of structures, meaning that the operation of the processes of this invention is not severely limited by the structure of either reactant, except that the hydrosiloxane reactant molecule must contain at least one reactive =Si—H group, and the polyether reactant molecule must contain one and preferably contains two $CH_2=CRCH_2$— end groups wherein R is a monovalent hydrocarbon group.

The organohydrosiloxane reactants employed in the present invention are reacted with the polyethers of the present invention at addition reaction conditions under which the silicon-bonded hydrogen and the silicon to which it is bonded become bonded respectively to the vicinal carbon atoms comprising the unsaturation of the $CH_2=CRCH_2$— end groups of the polyether.

Particularly preferred block copolymers of this invention are those having repeating units of the formula:

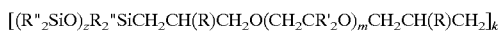

wherein R, R' and R" and z and m are as previously defined and z is an integer of at least one, preferably 1 to 100, more preferably 10 to 50 and k is an integer of at least one, preferably 10 to 50, more preferably 17 to 40.

The hydrosilation reaction is facilitated by using catalytic amounts of a noble metal-containing catalyst. Such catalysts are well known and include platinum, palladium and rhodium-containing catalysts. They are reviewed in the compendium, *Comprehensive Handbook on Hydrosilylation*, edited by B. Marciniec, relevant portions of which are incorporated herein by reference. Chloroplatinic acid and the platinum complexes of 2,4-pentanedione are particularly preferred. The catalyst is employed in an effective amount sufficient to initiate, sustain and complete the hydrosilation reaction. The amount of catalyst is usually within the range of from about 1 to about 100 parts per million (ppm) of noble metal, based on the total parts of the mixture of reactants and solvent. Catalyst concentrations of 1–20 ppm are preferred.

The reaction conditions are the critical part of obtaining the high molecular weight copolymers described herein. The reaction is conducted by reacting a mixture of allyl-terminated polyether, silanic fluid, and catalyst at subatmospheric pressure at a temperature at which the reaction occurs. The catalyzation temperature may be from 20°–120° C. for example, with 20°–90° C. being preferred. The mixture is placed under a vacuum which may be from 750 mmHg to 1 mmHg. The preferred vacuum is between 200–20 mmHg. The reaction mixture, if required, is then heated to between 55°–120° C. and allowed to react to completion. Once the polyether and silanic reactants are combined with the catalyst and any solvent, the resulting mixture can be heated following which vacuum is applied, or vacuum can be applied while the mixture is still at its initial temperature following which the mixture is heated while under vacuum.

The use of a non-reactive, low volatile, non-fogging environmentally friendly solvent is preferred, but it is not an absolute requirement when compatible or nearly compatible reactants are used. A cosolvent is preferred for reactions where the organohydrosiloxanes and the polyethers will form extremely viscous materials. However, if a volatile solvent such as toluene, benzene, xylene, methanol, ethanol, n-propanol, 2,2,4-trimethyl-1,3 pentanediol, isopropylether or isopropanol is used initially as a compatabilizing agent, this solvent may be removed, under vacuum, immediately after the clearpoint of the reaction is attained and can optionally be replaced with a less volatile, more environmentally favorable solvent while still obtaining the benefits of the invention. Examples of such less volatile solvents include dipropylene glycol, isopropyl palmitate, isopropyl myristate, butyl myristate, dodecylbenzene, natural vegetable oils such as soybean oil, corn oil, safflower oil, or linseed oil, and polypropylene glycol.

Chloroplatinic acid hexahydrate dissolved in ethanol, methanol, or isopropanol is the preferred soluble catalyst due to the low cost and ease of removal of the alcohol employing the process of this invention (the vacuum stripping method of production). It is also preferred because a filtration step is not required, thus saving valuable production time. Catalyst concentrations similar to those used in the prior art are useful. For example, as disclosed in U.S. Pat. No. 3,507,815, useful catalysts may contain from 0.001 to 5.0 weight percent platinum based on the weight of the reactants. The amount of platinum used in the reactions will be from 1 to 20 ppm by weight of the copolymer. In regard to the solvent and catalyst considerations above, the processes of the present invention are critical with regard to temperature, vacuum, and catalyst concentration.

The processes of the present invention are operable in many versions of standard reaction equipment which have provisions for adequate heating, cooling, vacuum, agitation, and maintenance for an inert atmosphere. The reaction scale is not limited by size and may range from several grams to several thousand kilograms. Thus, these processes are not narrowly critical with regard to scale or equipment used.

Because of the wide variety of structures which can be prepared by the new processes described herein, these processes can be used to prepare a wide variety of useful siloxane polyether copolymers. Such copolymers find use, for example, as wetting agents, thickeners, emulsifiers, antifoaming agents, urethane foam stabilizers for foams of various types (rigid, polyester, flexible, polyether, frothed, high resiliency, semiflexible, microcellular, and automotive interior trim foam, etc.), lubricants, aqueous aerosol shave cream stabilizers, and for other uses known for commercially available siloxane polyether copolymers.

The polysiloxanes of the present invention can be tailor-made to fit an intended application by choosing the particular structure of the organohydrosiloxane and the polyether. These materials can also be reacted in such a way as to have differentiated product containing the same organohydrosiloxane and polyether. This can be accomplished by controlling the molecular weight of the copolymer, thereby giving two distinct copolymers with different properties. Thus, the reactants can be chosen to obtain a novel product which finds use as an aqueous wetting agent. Another novel product can be useful as a surfactant for rigid polyurethane foam. Still another novel product can be useful as a surfactant for flexible polyether foam.

The preferred structures are derived from reactions of dihydropolydimethyl-siloxanes having a silicon-bonded hydrogen at each end of each molecule and polyethers having CH$_2$=C(R)CH$_2$— groups at each end of the polyether molecule, wherein R is a monovalent hydrocarbon group. These novel, high molecular weight, linear, nonhydrolyzable, siloxane-polyether [AB]$_n$ block copolymers are useful in the same areas as their hydrolyzable analogs, i.e., as surfactants for making frothed urethane foam and for making open-celled rigid urethane foam. Because of their hydrolytically stable nature, they are useful in a variety of applications in which they come in contact with water or other protic solvents wherein hydrolyzable linear silicone polyether copolymers would be unstable and, thus, not suitable. Applications entailing water contact include aqueous foaming and thickening agents, water soluble lubricants, aqueous emulsions, and the like. Of these preferred structures, the most preferred are derived from co-reactions of dihyropolydimethylsiloxanes and dimethally polyethers.

The siloxane polyether copolymers of the present invention can be incorporated in the urethane foam compositions of the prior art as a substitute for, and in the same amounts as, the hydrolyzable siloxane polyether foam components used in the prior art compositions. The copolymers of the current invention are of highest molecular weight and therefore exhibit improved foaming properties as compared to earlier [AB]$_n$ compositions. Typical urethane foam compositions into which the copolymers of the present invention may be incorporated are disclosed in U.S. Pat. Nos. 3,280, 160, 3,507,815, 3,792,073, 3,793,237, and 3,836,560, herein incorporated by reference. As in U.S. Pat. No. 3,507,815, the amount of the siloxane/polyether block copolymer of the present invention employed as a foam stabilizer can vary over wide limits from about 0.1 weight percent to 10 weight percent or more, based on the total weight of the foam formulation. Preferably, the amount of the siloxane/polyether copolymers present in the foam formulations ranges from about 0.5 weight percent to about 2.0 weight percent based on the total weight of the foam formulation.

The following examples are presented. In the examples, unless otherwise indicated, all temperatures are on the Centigrade scale, all parts and percentages are on a weight basis, Me designates the methyl group, "cSt" denotes centistokes as determined with a Cannon-Fenske Routine Viscometer at 25° C., "g" denotes grams, "$\mu$" denotes microns, "ppm" denotes parts per million, "ml" denotes milliliters, "min" denotes minutes, "mm" denotes millimeters, "GPC" denotes the gel permeation chromatography for determining molecular weight as described in U.S. Pat. No. 3,836,560, "$DP_n$" denotes degree of polymerization of $[AB]_n$ copolymers as determined by dividing the GPC analyzed molecular weight of the copolymer by the molecular weight of the repeating unit (AB) in the copolymer.

EXAMPLE 1

Preparation of a Nonhydrolyzable [AB]n Copolymer Using the Vacuum Method

A one-liter, three-necked, round-bottom flask, equipped with a mechanical stirrer, a thermocouple, a nitrogen sparge, a condenser and a vacuum system, was flushed with nitrogen and charged with: 166.36 g of dimethallyl-terminated polyether (mw 3170) containing nominally by weight 60% oxyethylene and 40% oxypropylene. The structure would be $CH_2$=$C(CH_3)CH_2O(C_2H_4O)_{41}(C_3H_6O)_{21}CH_2(CH_3)$ $C$=$CH_2$. This will be called structure polyether A for the remainder of the examples; 83.64 g of a dihydropolydimethylsiloxane having an average molecular weight of 1540 and represented by the nominal formula:

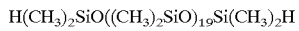

herein known as Silanic Fluid B; and 250 g of isopropyl palmitate (IPP). The stirred mixture was heated to 85° C. Once at 85° C., the mixture was catalyzed with 5 ppm of chloroplatinic acid (0.24 cc of a 3.3%, by weight, solution of hexachloroplatinic acid in ethanol). The reaction vessel was immediately placed under vacuum, 100 mm Hg, and reacted for a total of 6 hours. After 6 hours, the vessel was cooled to 25° C. and the vacuum removed. A sample of the viscous material was treated with alcoholic KOH which showed that it contained no silicon-bonded hydrogen. It had a Cannon-Fenske viscosity of 15,820 cSt at 25° C. and 50% solids in IPP. The product had a molecular weight of 113,253 by GPC and a degree of polymerization of 24.04, and can be represented nominally by repeating units of the average formula:

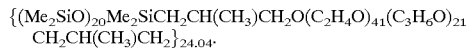

EXAMPLE 2

Preparation of a Nonhydrolyzable [AB]n Copolymer Using the Vacuum Method

A one-liter, three-necked, round-bottom flask, equipped with a mechanical stirrer, a thermocouple, a nitrogen sparge, a condenser and a vacuum system, was flushed with nitrogen and charged with: 166.36 g of Polyether A. The structure would be nominally $CH_2$=$C(CH_3)CH_2O(C_2H_4O)_{41}$ $(C_3H_6O)_{21}CH_2(CH_3)C$=$CH_2$; 83.64 g of a dihydropolydimethylsiloxane having an average molecular weight of 1540 and represented by the nominal formula: $H(CH_3)_2SiO$ $((CH_3)_2SiO)_{19}Si(CH_3)_2H$ (Silanic Fluid B); and 250 g of isopropyl palmitate (IPP). The stirred mixture was heated to 30° C. Once at 30° C., the mixture was catalyzed with 5 ppm of chloroplatinic acid (0.24 cc of a 3.3%, by weight, solution of hexachloroplatinic acid in ethanol). The stirred mixture was immediately heated to 85° C. Once at 85° C., the reaction vessel was immediately placed under vacuum at 100 mm Hg and allowed to react for a total of 6 hours. After 6 hours, the vessel was cooled to 25° C. and the vacuum removed. A sample of the viscous material was withdrawn from the reaction vessel and treated with alcoholic KOH which showed that it contained no silicon-bonded hydrogen. It had a Cannon-Fenske viscosity of 14,754 cSt at 25° C. and 50% solids in IPP. The product had a molecular weight of 98,379 by GPC and a degree of polymerization of 21, and can be represented by repeating units of the average formula:

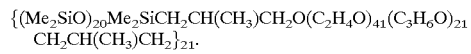

EXAMPLE 3

Preparation of a Nonhydrolyzable [AB]n Copolymer Using the Vacuum Method in a Volatile Solvent A one-liter, three-necked, round-bottom flask, equipped with a mechanical stirrer, a thermocouple, a nitrogen sparge, a condenser and a vacuum system, was flushed with nitrogen and charged with: 166.36 g of Polyether A. The structure would be nominally $CH_2$=$C(CH_3)CH_2O(C_2H_4O)_{41}$ $(C_3H_6O)_{21}CH_2(CH_3)C$=$CH_2$; 83.64 g of a dihydropolydimethylsiloxane having an average molecular weight of 1540 and represented by the nominal formula $H(CH_3)_2SiO$ $((CH_3)_2SiO)_{19}Si(CH_3)_2H$ herein known as Silanic Fluid B; and 250 g of toluene. The stirred mixture was heated to 85° C. Once at 85° C., the mixture was catalyzed with 5 ppm of chloroplatinic acid (0.24 cc of a 3.3%, by weight, solution of hexachloroplatinic acid in ethanol). The reaction was continued until such a point as the reactants become homogeneous. At that point the reaction vessel was placed under vacuum at 100 mm Hg. This removes the toluene solvent and, to the stripped copolymer, 250 g of isopropyl palmitate is added. This was reacted to give a total reaction time of 6 hours. After 6 hours, the vessel was cooled to 25° C. and the vacuum removed. A sample of the viscous material was treated with alcoholic KOH which showed that it contained no silicon-bonded hydrogen. It had a Cannon Fenske viscosity of 14,658 cSt at 25° C. and 50% isopropyl palmitate. The product had a molecular weight of 95,393 by GPC and a degree of polymerization of 20.4, and can be represented nominally by repeating units of the average formula:

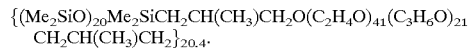

EXAMPLE 4

Comparison of Example 1, Nonhydrolyzable [AB]n Copolymer Using the Traditional Method Without Vacuum A one-liter, three-necked, round-bottom flask, equipped with a mechanical stirrer, a thermocouple, a nitrogen sparge, a condenser, was flushed with nitrogen and charged with: 166.36 g of Polyether A; 83.64 g of a dihydropolydimethylsiloxane having an average molecular weight of 1540 and represented by the nominal formula: $H(CH_3)_2SiO((CH_3)_2SiO)_{19}Si(CH_3)_2H$, (Silanic Fluid B); and 250 g of isopropyl palmitate (IPP). The stirred mixture was heated to 85° C. Once at 85° C., the mixture was catalyzed with 5 ppm of chloroplatinic acid (0.24 cc of a 3.3%, by weight, solution of hexachloroplatinic acid in ethanol). The reaction vessel was maintained at atmospheric pressure and reacted for a total of 6 hours. After 6 hours, the vessel was cooled to 25° C. A sample of the viscous material was withdrawn from the reaction vessel and treated with alcoholic KOH which showed that it contained no silicon-bonded hydrogen. It had a Cannon-Fenske viscosity of 2,147 cSt at 25° C. and 50% solids in IPP. The product had a molecular weight of 57,681 by GPC and a degree of polymerization of 12.2, and can be represented by repeating units of the average formula:

$$\{(Me_2SiO)_{20}Me_2SiCH_2CH(CH_3)CH_2O(C_2H_4O)_{41}(C_3H_6O)_{21}CH_2CH(CH_3)CH_2\}_{12.2}.$$

EXAMPLE 5

Preparation of a Nonhydrolyzable [AB]n Copolymer Using the Vacuum Method

A one-liter, three-necked, round-bottom flask, equipped with a mechanical stirrer, a thermocouple, a nitrogen sparge, a condenser and a vacuum system, was flushed with nitrogen and charged with: 153.48 g of Polyether A; 96.52 g of a dihydropolydimethylsiloxane having an average molecular weight of 1910 and represented by the nominal formula $H(CH_3)_2SiO((CH_3)_2SiO)_{24}Si(CH_3)_2H$ herein known as Silanic Fluid C; and 250 g of isopropyl palmitate (IPP). The stirred mixture was heated to 85° C. Once at 85° C., the mixture was catalyzed with 5 ppm of chloroplatinic acid (0.24 cc of a 3.3%, by weight, solution of hexachloroplatinic acid in ethanol). The reaction vessel was immediately placed under vacuum at 100 mm Hg and reacted for a total of 6 hours. After 6 hours, the vessel was cooled to 25° C. and the vacuum removed. A sample of the viscous material was withdrawn from the reaction vessel and was treated with alcoholic KOH which showed that it contained no silicon-bonded hydrogen. It had a Cannon-Fenske viscosity of 7,964 cSt at 25° C. and 50% solids in IPP. The product had a molecular weight of 94,459 by GPC and a degree of polymerization of 18.6, and can be represented by repeating units of the average formula:

$$\{(Me_2SiO)_{25}Me_2SiCH_2CH(CH_3)CH_2O(C_2H_4O)_{41}(C_3H_6O)_{21}CH_2CH(CH_3)CH_2\}_{18.6}.$$

EXAMPLE 6

Preparation of a Nonhydrolyzable [AB]n Copolymer Using the Vacuum Method

A one-liter, three-necked, round-bottom flask, equipped with a mechanical stirrer, a thermocouple, a nitrogen sparge, a condenser and a vacuum system, was flushed with nitrogen and charged with: 153.48 g of Polyether A; 96.52 g of a dihydropolydimethylsiloxane having an average molecular weight of 1910 and represented by the nominal formula: $H(CH_3)_2SiO((CH_3)_2SiO)_{24}Si(CH_3)_2H$ (Silanic Fluid C); and 250 g of isopropyl palmitate (IPP).
The stirred mixture was heated to 30° C. Once at 30° C., the mixture was catalyzed with 5 ppm of chloroplatinic acid (0.24 cc of a 3.3%, by weight, solution of hexachloroplatinic acid in ethanol). The stirred mixture was immediately heated to 85° C., and the reaction vessel was immediately placed under vacuum at 100 mm Hg and allowed to reacted for a total of 6 hours. After 6 hours, the vessel was cooled to 25° C. and the vacuum removed. A sample of the viscous material was withdrawn from the reaction vessel and treated with alcoholic KOH which showed that it contained no silicon-bonded hydrogen. It had a Cannon-Fenske viscosity of 7,373 cSt at 25° C. and 50% solids in IPP. The product had a molecular weight of 88964 by GPC and a degree of polymerization of 17.5, and can be represented by repeating units of the average formula:

$$\{(Me_2SiO)_{25}Me_2SiCH_2CH(CH_3)CH_2O(C_2H_4O)_{41}(C_3H_6O)_{21}CH_2CH(CH_3)CH_2\}_{17.5}.$$

EXAMPLE 7

Comparison of Example 5, Nonhydrolyzable [AB]n Copolymer Using the Traditional Method Without Vacuum A one-liter, three-necked, round-bottom flask, equipped with a mechanical stirrer, a thermocouple, a nitrogen sparge, a condenser, was flushed with nitrogen and charged with: 153.48 g of Polyether A; 96.52 g of a dihydropolydimethylsiloxane having an average molecular weight of 1910 and represented by the nominal formula: $H(CH_3)_2SiO((CH_3)_2SiO)_{24}Si(CH_3)_2H$ (Silanic Fluid C); and 250 g of isopropyl palmitate (IPP). The stirred mixture was heated to 85° C. Once at 85° C., the mixture was catalyzed with 5 ppm of chloroplatinic acid (0.24 cc of a 3.3%, by weight, solution of hexachloroplatinic acid in ethanol). The reaction vessel was maintained at atmospheric pressure and reacted for a total of 6 hours. After 6 hours, the vessel was cooled to 25° C. A sample of the viscous material was withdrawn from the reaction vessel and treated with alcoholic KOH which showed that it contained no silicon-bonded hydrogen. It had a Cannon-Fenske viscosity of 957 cSt at 25° C. and 50% solids in IPP. The product had a molecular weight of 65,496 by GPC and a degree of polymerization of 12.9, and can be represented by repeating units of the average formula:

$$\{(Me_2SiO)_{25}Me_2SiCH_2CH(CH_3)CH_2O(C_2H_4O)_{41}(C_3H_6O)_{21}CH_2CH(CH_3)CH_2\}_{12.9}.$$

EXAMPLE 8

Preparation of a Nonhydrolyzable [AB]n Copolymer Using the Vacuum Method

A one-liter, three-necked, round-bottom flask, equipped with a mechanical stirrer, a thermocouple, a nitrogen sparge, a condenser and a vacuum system, was flushed with nitrogen and charged with: 198.66 g of Polyether A; 55.20 g of a dihydropolydimethylsiloxane having an average molecular weight of 800 and represented by the nominal formula $H(CH_3)_2SiO((CH_3)_2SiO)_9Si(CH_3)_2H$ herein known as Silanic Fluid D; and 250 g of isopropyl palmitate (IPP). The stirred mixture was heated to 85° C. Once at 85° C., the mixture was catalyzed with 5 ppm of chloroplatinic acid (0.24 cc of a 3.3%, by weight, solution of hexachloroplatinic acid in ethanol). The reaction vessel was immediately placed under vacuum at 100 mm Hg and reacted for a total of 6 hours. After 6 hours, the vessel was cooled to 25° C. and the vacuum removed. A sample of the viscous material was withdrawn from the reaction vessel and treated with alcoholic KOH which showed that it contained no silicon-bonded hydrogen. It had a Cannon-Fenske viscosity of 11,312 cSt at 25° C. and 50% solids in IPP. The product had a molecular weight of 75,566 by GPC and a degree of polymerization of 19.0, and can be represented by repeating units of the average formula:

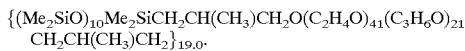

EXAMPLE 9

Preparation of a Nonhydrolyzable [AB]n Copolymer Using the Vacuum Method

A one-liter, three-necked, round-bottom flask, equipped with a mechanical stirrer, a thermocouple, a nitrogen sparge, a condenser and a vacuum system, was flushed with nitrogen and charged with: 198.66 g of Polyether A; 55.20 g of a dihydropolydimethylsiloxane having an average molecular weight of 800 and represented by the nominal formula: $H(CH_3)_2SiO((CH_3)_2SiO)_9Si(CH_3)_2H$ (Silanic Fluid D); and 250 g of isopropyl palmitate (IPP) The stirred mixture was heated to 30° C. Once at 30° C., the mixture was catalyzed with 5 ppm of chloroplatinic acid (0.24 cc of a 3.3%, by weight, solution of hexachloroplatinic acid in ethanol). The stirred mixture was immediately heated to 85° C. Once at 85° C., the reaction vessel was immediately placed under vacuum at 100 mm Hg and reacted for a total of 6 hours. After 6 hours, the vessel was cooled to 25° C. and the vacuum removed. A sample of the viscous material was withdrawn from the reaction vessel and treated with alcoholic KOH which showed that it contained no silicon-bonded hydrogen. It had a Cannon-Fenske viscosity of 8,088 cSt at 25° C. and 50% solids in IPP. The product had a molecular weight of 71,572 by GPC and a degree of polymerization of 18.0, and can be represented by repeating units of the average formula:

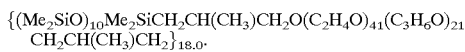

EXAMPLE 10

Comparison of Example 8, Nonhydrolyzable [AB]n Copolymer Using the Traditional Method Without Vacuum A one-liter, three-necked, round-bottom flask, equipped with a mechanical stirrer, a thermocouple, a nitrogen sparge, a condenser, was flushed with nitrogen and charged with: 198.66 g of Polyether A; 55.20 g of a dihydropolydimethylsiloxane having an average molecular weight of 800 and represented by the nominal formula: $H(CH_3)_2SiO((CH_3)_2SiO)_9Si(CH_3)_2H$ (Silanic Fluid D); and 250 g of isopropyl palmitate (IPP). The stirred mixture was heated to 85° C. Once at 85° C., the mixture was catalyzed with 5 ppm of chloroplatinic acid (0.24 cc of a 3.3% by weight, solution of hexachloroplatinic acid in ethanol). The reaction vessel was maintained at atmospheric pressure and reacted for a total of 6 hours. Ater 6 hours, the vessel was cooled to 25° C. A sample of the viscous material was withdrawn from the reaction vessel and treated with alcoholic KOH which showed that it contained no silicon-bonded hydrogen. It had a Cannon-Fenske viscosity of 2552 cSt at 25° C. and 50% solids in IPP. The product had a molecular weight of 50,810 by GPC and a degree of polymerization of 12.8, and can be represented by repeating units of the average formula:

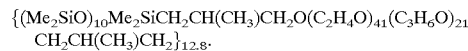

| Example Number | SiH, Type, Grams | Polyether Grams | Cat temp, C. | Vacuum mm Hg | Hold Temperature | Reaction Time | Viscosity cSt | GPC Mw | DPn |
|---|---|---|---|---|---|---|---|---|---|
| 1 | Silanic Fluid B 83.64 g | POLYETHER A 166.36 g | 85° C. | 100 mm Hg Immediately | 85° C. | 6 hours | 15,820 | 113,253 | 24.0 |
| 2 | Silanic Fluid B 83.64 g | POLYETHER A 166.36 | 30° C. | 100 mm Hg 85° C. | 85° C. | 6 hours | 14,754 | 98,379 | 21.0 |
| 3 | Silanic Fluid B 83.64 g | POLYETHER A 166.36 g | 85° C.** | 100 mm Hg Homogeneous | 85° C. | 6 hours | 14,658 | 95,393 | 20.4 |
| 4 | Silanic Fluid B 83.64 g | POLYETHER A 166.36 g | 85° C. | 760 mm Hg | 85° C. | 6 hours | 2,147 | 57,681 | 12.2 |
| 5 | Silanic Fluid C 96.52 g | POLYETHER A 153.48 g | 85° C. | 100 mm Hg Immediately | 85° C. | 6 hours | 7,964 | 94,459 | 18.6 |
| 6 | Silanic Fluid C 96.52 | POLYETHER A 153.48 | 30° C. | 100 mm Hg 85° C. | 85° C. | 6 hours | 7373 | 88,964 | 17.5 |
| 7 | Silanic Fluid C 96.52 g | POLYETHER A 153.48 g | 85° C. | 760 mm Hg | 85° C. | 6 hours | 957 | 65,496 | 12.9 |
| 8 | Silanic Fluid D 55.20 g | POLYETHER A 198.66 g | 85° C. | 100 mm Hg Immediately | 85° C. | 6 hours | 11,312 | 75,566 | 19.0 |
| 9 | Silanic Fluid D 55.20 g | POLYETHER A 198.66 | 30° C. | 100 mm Hg 85° C. | 85° C. | 6 hours | 8088 | 71570 | 18.0 |
| 10 | Silanic Fluid D 55.20 g | POLYETHER A 198.66 g | 85° C. | 760 mm Hg | 85° C. | 6 hours | 2,552 | 50,810 | 12.8 |

**Reaction initially carried out in 50% Toluene solvent $$(DP)n = \frac{\text{Copolymer Mw determined by GPC}}{\Sigma \text{ Mw Polyether A + Mw Silanic Fluid}}$$

All experiments were conducted in a similar fashion. The DPn are calculated values based upon the sum of the known molecular weight of Polyether A and the calculated molecular weight determined for either Silanic fluids B, C, and D, divided into the GPC determined molecular weight of the copolymer as described above. All products afforded clear homogenous products with low volatile organic contents.

Examples 4, 7, and 10 are provided for reference and are indicative of known prior art and are conducted without the benefit of the present claimed invention and are given as reference.

Examples 1, 2,3, and 4 comprise one set of experiments with identical raw materials and charges (except for example 3, which starts out in toluene and is then removed). Examples 1, 3, and 4 were catalyzed at 85° C. while Example 2 was catalyzed at 30° C. and then heated to the reaction temperature of 85° C. and a vacuum pulled immediately upon reaching 85° C. Examples 1, 2, and 3 employ the benefit of the present invention and example 3 also employs the added benefit of being run in a volatile solvent which is removed after reaching the homogeneous stage.

Examples 1, 2, 3, and 4 were performed using identical raw materials (Polyether A and Silanic Fluid B) and identical charges. Examples 1, 2, and 3 employed the improved process of this invention and have afforded higher molecular weights and DPn's than example 4, which is conducted without the benefit of the present invention. Example 1, 2, and 3 afforded substantially higher measured molecular weights of 113,253; 98,379; and 95,393 daltons (DP of 24.0, 21.0, and 20.4) versus that of example 4 which afforded a lower molecular weight of 57,681 daltons (DP of 12.2). Example 3 also demonstrated the ability to initially employ a volatile compatabilizing solvent. Once the clear point of the reaction has been obtained, the toluene solvent is removed and replaced by a non-volatile, non-fogging solvent.

Examples 5, 6, and 7 comprise a second set of experiments. Examples 5, 6, and 7 were performed using identical raws materials (Polyether A and Silanic Fluid C) and identical charges. Examples 5 and 7 were catalyzed at 85° C. while Example 6 was catalyzed at 30° C. and then heated to the reaction temperature of 85° C. and a vacuum pulled immediately upon reaching 85° C. Examples 5 and 6 employed the improved process of this invention and have afforded higher molecular weights and DPn's than example 7, which is conducted without the benefit of the present invention. Examples 5 and 6 afforded substantially higher measured molecular weights of 94,459 and 88,964 daltons (DP of 18.6. and 17.5) versus that of Example 7 which afforded a lower molecular weight of 65,496 daltons (DP of 12.9).

Examples 8, 9, and 10 comprise a third set of experiments. Examples 8, 9, and 10 were performed using identical raws materials (Polyether A and Silanic Fluid D) and identical charges. Examples 8 and 10 were catalyzed at 85° C. while Example 9 was catalyzed at 30° C. and then heated to the reaction temperature of 85° C. and a vacuum pulled immediately upon reaching 85° C. Examples 8 and 9 employed the improved process of this invention and have afforded higher molecular weights and DPn's than example 10 which is conducted without the benefit of the present invention. Examples 8 and 9 afforded substantially higher measured molecular weights of 75,566 and 71,570 daltons (DP of 19.0. and 18.0) versus that of example 10 which afforded a lower molecular weight of 50,810 daltons (DP of 12.8).

The uniqueness of the present invention allows for the production of heretofore unknown higher molecular weight copolymers with improved product performance. The benefits of obtaining clear, homogeneous products without the necessity of product filtration is another major advantage.

What is claimed is:

1. A process of producing siloxane-polyoxyalkylene copolymer, comprising reacting organohydrosiloxane and allyl-terminated poly(oxyalkylene), in the presence of a catalyst for said reaction, under a vacuum of 1–750 mmHg.

2. The process of claim 1 wherein the copolymer has an $\{AB\}_n$ structure.

3. The process of claim 1 wherein the vacuum is 200–20 mmHg.

4. The process of claim 1 wherein the reaction is carried out at 20° C. to 120° C.

5. The process of claim 1 wherein the reaction is carried out at 20° C. to 90° C.

6. The process of claim 1 comprising combining said organohydrosiloxane, poly(oxyalkylene), and catalyst, applying vacuum to the resulting mixture, and heating said mixture.

7. The process of claim 1 wherein said poly(oxyalkylene) has the formula

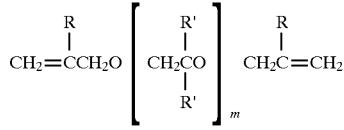

wherein m is an integer of 0 to 100, and R and R' are independently in each occurrence hydrogen or a monovalent hydrocarbon group selected from the group consisting of $C_1$–$C_{18}$ alkyl groups, aryl groups, aralkyl groups, alkaryl groups, and cycloalkyl groups.

8. The process of claim 7 where m is 1 to 100.

9. The process of claim 7 wherein each R and R' group is alkyl.

10. The process of claim 7 wherein each R and R' group is methyl.

11. The process of claim 1 wherein the organohydrosiloxane reactant has one or more units of the formula:

with or without one or more units of the formula:

wherein R" is independently in each occurrence an optionally halogen-substituted monovalent hydrocarbon group which is selected from the group consisting of $C_1$–$C_{18}$ alkyl groups, aryl groups, aralkyl groups, alkaryl groups, and cycloalkyl groups; a is an integer of 0 to 2, and b is an integer of 0 to 3.

12. A process according to claim 11 wherein a is 2.

13. A process according to claim 11 wherein b is 2.

14. A process according to claim 1 wherein the organohydrosiloxane reactant has the formula $HR''_2SiO[R''_2SiO]_z SiR''_2H$ in which R" in each occurrence is an unsubstituted or halogen-substituted monovalent alkyl group and z is an integer of 1 to 100.

15. A process according to claim 1 wherein the catalyst is chloroplatinic acid.

16. A process according to claim 1 comprising combining said organohydrosiloxane, allyl-terminated poly(oxyalkylene), and catalyst in a volatile solvent, reacting said organohydrosiloxane and poly(oxyalkylene) under said vacuum to the clear point, removing said volatile solvent under said vacuum, adding a second solvent, and completing said reaction in said second solvent.

17. A process according to claim 16 wherein said volatile solvent is selected from the group consisting of toluene, xylene, benzene, ethanol, n-propanol and isopropanol.

18. A process according to claim 16 wherein said second solvent is selected from the group consisting of dipropylene glycol, isopropyl palimitate, dodecylbenzene, isopropyl myristate, butyl myristate, natural vegetable oils, and polypropylene glycol.

19. A copolymer produced by the process of claim 1.

20. A copolymer according to claim 19 which has a $\{AB\}_n$ structure.

21. A copolymer according to claim 19 having a DP of at least 17.

22. A copolymer according to claim 19 wherein said poly(oxyalkylene) has the formula

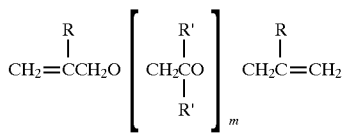

wherein m is an integer of 0 to 100, and R and R' are independently in each occurrence hydrogen or a monovalent hydrocarbon group selected from the group consisting of $C_1$–$C_{18}$ alkyl groups, aryl groups, aralkyl groups, alkaryl groups, and cycloalkyl groups.

23. A copolymer according to claim 22 wherein the organohydrosiloxane reactant has one or more units of the formula:

$HR''_a SiO_{(3-a)/2}$ with or without one or more units of the formula:

$R''_b SiO_{(4-b)/2}$ wherein R" is independently in each occurrence an optionally halogen-substituted monovalent hydrocarbon group which is selected from the group consisting of $C_1$–$C_{18}$ alkyl groups, aryl groups, aralkyl groups, alkaryl groups, and cycloalkyl groups; a is an integer of 0 to 2, and b is an integer of 0 to 3.

24. A copolymer according to claim 19 wherein the organohydrosiloxane reactant has one or more units of the formula:

$HR''_a SiO_{(3-a)/2}$ with or without one or more units of the formula:

$R''_b SiO_{(4-b)/2}$ wherein R" is independently in each occurrence an optionally halogen-substituted monovalent hydrocarbon group which is selected from the group consisting of $C_1$–$C_{18}$ alkyl groups, aryl groups, aralkyl groups, alkaryl groups, and cycloalkyl groups; a is an integer of 0 to 2, and b is an integer of 0 to 3.

25. A copolymer according to claim 19 wherein the organohydrosiloxane reactant has the formula $HR''_2SiO[R''_2SiO]_z SiR''_2 H$ in which R" in each occurrence is an unsubstituted or halogen-substituted monovalent alkyl group and z is an integer of 1 to 100.

26. A copolymer according to claim 22 wherein the organohydrosiloxane reactant has the formula $HR''_2SiO[R''_2SiO]_z SiR''_2 H$ in which R" in each occurrence is an unsubstituted or halogen-substituted monovalent alkyl group and z is an integer of 1 to 100.

27. A copolymer produced according to the process of claim 16.

28. A copolymer according to claim 19 having repeating units of the formula:

$((R''_2 SiO)_z R_2 ''SiCH_2 CH(R)CH_2 O(CH_2 CR'_2 O)_m CH_2 CH(R)CH_2)_k$ wherein R and R' are independently in each occurrence hydrogen or a monovalent hydrocarbon group selected from the group consisting of $C_1$–$C_{18}$ alkyl groups, aryl groups, aralkyl groups, alkaryl groups, and cycloalkyl groups;

R" is independently in each occurrence an optionally halogen-substituted monovalent hydrocarbon group which is selected from the group consisting of $C_1$–$C_{18}$ alkyl groups, aryl groups, aralkyl groups, alkaryl groups, and cycloalkyl groups; and z is an integer of at least 1, and k is an integer of at least 1.

29. A copolymer according to claim 27 wherein z is 1 to 100 and k is 10 to 50.

* * * * *